US007966573B2

(12) United States Patent (10) Patent No.: US 7,966,573 B2
Dodge et al. (45) Date of Patent: Jun. 21, 2011

(54) METHOD AND SYSTEM FOR IMPROVING INTERACTION WITH A USER INTERFACE

(75) Inventors: Steven P. Dodge, Sammamish, WA (US); Alexander J. Kolmykov-Zotov, Sammamish, WA (US); Bryan D. Scott, Bothell, WA (US); Reed L. Townsend, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 11/356,374

(22) Filed: Feb. 17, 2006

(65) Prior Publication Data

US 2007/0198950 A1 Aug. 23, 2007

(51) Int. Cl.
*G06F 3/048* (2006.01)
(52) U.S. Cl. .................... 715/815; 715/710; 345/173
(58) Field of Classification Search .................. 715/700, 715/710, 863, 864, 861, 815; 345/173, 174
See application file for complete search history.

(56) References Cited

U.S. PATENT DOCUMENTS

| 5,638,523 | A | * | 6/1997 | Mullet et al. ................... 715/855 |
| 5,736,974 | A | * | 4/1998 | Selker ............................ 715/862 |
| 5,977,966 | A | * | 11/1999 | Bogdan .......................... 715/800 |
| 5,986,639 | A | * | 11/1999 | Ozawa et al. .................. 715/856 |
| 6,091,422 | A | | 7/2000 | Ouakine et al. |
| 6,100,889 | A | * | 8/2000 | Sciammarella et al. ....... 715/815 |
| 6,549,218 | B1 | | 4/2003 | Gershony et al. |
| 6,631,523 | B1 | | 10/2003 | Matthews, III et al. |
| 6,844,887 | B2 | * | 1/2005 | Laffey et al. ................... 715/861 |
| 7,434,177 | B1 | * | 10/2008 | Ording et al. .................. 715/862 |
| 7,614,018 | B1 | * | 11/2009 | Ohazama et al. .............. 715/862 |
| 2003/0222923 | A1 | * | 12/2003 | Li .................................. 345/815 |
| 2004/0070593 | A1 | | 4/2004 | Neely et al. |
| 2004/0160419 | A1 | * | 8/2004 | Padgitt .......................... 345/173 |
| 2005/0024341 | A1 | * | 2/2005 | Gillespie et al. .............. 345/173 |

(Continued)

FOREIGN PATENT DOCUMENTS

WO WO 2005091124 A 9/2005

OTHER PUBLICATIONS

Lindell, R., "Towards new Interaction: A Content Centric Data Surface Approach," Malardalen University Licentiate Thesis No. 39, Malardalen University, Nov. 2004, pp. 1-113.
Meyer, A., "Pen Computing: A Technology Overview and a Vision," SigCHI Bulletin, vol. 27, No. 3, Jul. 1995, pp. 46-90.

(Continued)

*Primary Examiner* — Weilun Lo
*Assistant Examiner* — Phenuel S Salomon
(74) *Attorney, Agent, or Firm* — Woodcock Washburn LLP

(57) ABSTRACT

Upon detection of user input, a computing device (e.g., tablet PC, PDA, cellular device) may determine whether the input corresponds to a request to enhance elements of the user interface. In response to a positive determination, the computing device may magnify or otherwise modify the appearance of particular graphical elements of the interface to facilitate user interaction. The computing device identifies one or more graphical elements that are within a predefined proximity or area of the input location and displays an enlarged version of those elements to provide the user with a larger interaction area. Additionally, a computing device may clone (i.e., copy) the identified elements and enlarge the cloned elements at a specified region of the user interface. In another aspect, the computing device may magnify the entire area associated with the location of user input, rather than just the interactive elements of that predefined area.

18 Claims, 8 Drawing Sheets

U.S. PATENT DOCUMENTS

| | | |
|---|---|---|
| 2005/0183017 A1 | 8/2005 | Cain |
| 2005/0193351 A1* | 9/2005 | Huoviala ...................... 715/815 |
| 2005/0193380 A1 | 9/2005 | Vitanov et al. |
| 2005/0223080 A1 | 10/2005 | Gray |
| 2005/0246725 A1 | 11/2005 | Odins-Lucas et al. |
| 2006/0161871 A1* | 7/2006 | Hotelling et al. ............. 715/863 |

OTHER PUBLICATIONS

Beaudouin-Lafin et al., M.. "The Architecture and Implementation of CPN2000, A Post-WIMP Graphical Application," CHI Letters, vol. 2, 2, 2000, pp. 181-190.

* cited by examiner

METHOD AND SYSTEM FOR IMPROVING INTERACTION WITH A USER INTERFACE

BACKGROUND

Interaction with computing devices has undergone tremendous changes since the inception of the graphical user interface. Users are able to interact with such visual displays using a variety of input devices. In many cases, computing devices such as personal data assistants (PDAs) and tablet personal computers (tablet PCs) have eliminated the need to carry or use external input peripherals such as mice and keyboards to further improve mobility and flexibility. As such, PDAs and tablet PCs now allow a user to interact with the device and/or an application running thereon directly through a touch-sensitive display screen using the user's finger, a built-in pen, or other stylus. Graphical user interfaces have also been adapted to facilitate such operating environments and methods. For example, documents or other components of the display screen will often automatically change orientations depending on how the user is holding or carrying the device. Similarly, applications have been developed that allow users to directly "write" in an electronic document using a stylus just as one would on a sheet of paper.

Many graphical user interfaces running on computing devices such as tablet PCs often use graphical elements such as windows and icons to represent various forms of data or data structures. Oftentimes, due screen size limitations, resolution restrictions or other factors, the appearances of such elements are reduced in size. Thus, those using their fingers to interact with the graphical elements may encounter difficulties due to the size of the contact area of their fingers. Additionally, users having poor eyesight or lacking fine motor skills may also experience difficulties in interacting with small graphical elements that often require precise interaction.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the present disclosure are directed to modifying a graphical user interface and elements thereof to facilitate user interaction. For instance, by enlarging graphical elements of a user interface, or magnifying a portion of a user interface, in proximity to a location of user input (e.g., point of contact), a user may more easily select or otherwise interact with the elements of the interface. For example, window resizing tools may be enlarged to allow a user to more easily close or minimize a window displayed on an interface. A user may create rules that define correspondences between types of user input and types of user interface modifications. Alternatively or additionally, default rules may be predefined according to, for example, a particular application and/or operating system. These types of user input may include a tap on the display screen or continuous contact of a predefined duration. According to another aspect, the interactive or targetable elements of a display screen may be cloned at a specified region of the interface. The cloned elements may then be enlarged, rather than enlarging the original elements. The degree of magnification or enlargement may be pre- defined (e.g., preset by the user, a software application, or the operating system) or automatically determined according to one or more factors.

In yet another aspect, the user interface may determine a set of interactive elements to enlarge by transmitting a request message to at least one application associated with the user interface. A set may comprise one or more interactive elements. The request message may include information such as the location on the display screen where input was received as well as parameters related to a specified search area. Should the one or more applications return too many results in response to the request message, the information included in the request message may be modified (e.g., the specified search area narrowed) and the request message retransmitted.

BRIEF DESCRIPTION OF THE DRAWINGS

The present disclosure is illustrated by way of example and not by limitation in the accompanying figures in which like reference numerals indicate similar elements and in which.

DETAILED DESCRIPTION

In the following description, reference is made to the accompanying drawings, which form a part hereof, and in which is shown by way of illustration various embodiments. It is to be understood that other embodiments may be utilized and structural and functional modifications may be made without departing from the scope of the present disclosure.

Figure 1:
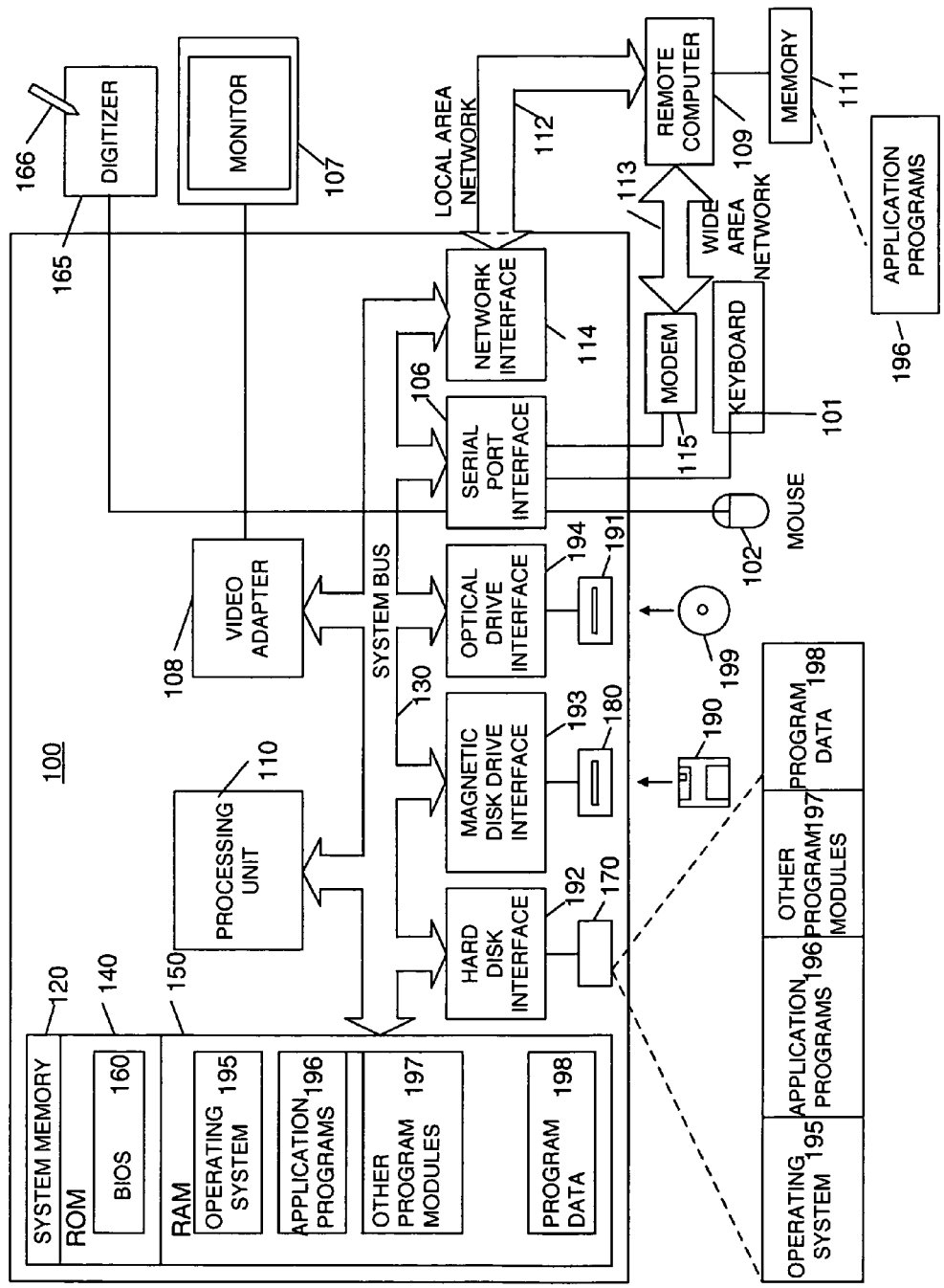
FIG. 1 illustrates a schematic diagram of a general-purpose digital computing environment that can be used to implement various aspects of the present disclosure.

FIG. 1 illustrates a schematic diagram of a general-purpose digital computing environment. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In some example environments, a stylus digitizer 165 and accompanying stylus 166 are provided in order to digitally capture freehand input. Although a connection between the digitizer 165 and the serial port interface 106 is shown in FIG. 1, in practice, the digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples, and other techniques for establishing a communications link between computers can be used. The existence of any of various well-known protocols such as TCP/IP, Ethernet, FTP, HTTP, UDP, and the like is presumed, and the computer 100 can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, an environment may be used having fewer than all of the various aspects shown in FIG. 1 and described above, and these aspects may appear in various combinations and subcombinations that will be apparent to one of ordinary skill. Additional elements, devices or subsystems also may be included in or coupled to the computer 100.

Figure 2:
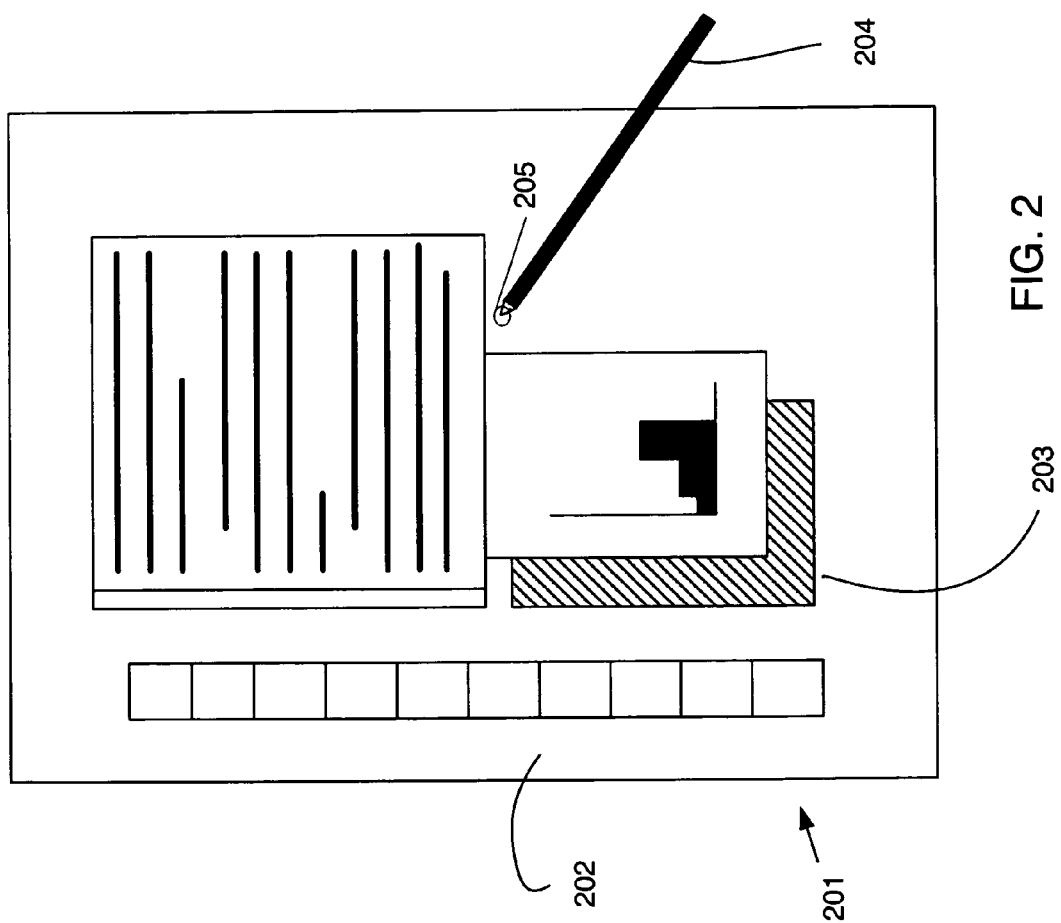
FIG. 2 illustrates a stylus-based personal computer (PC) 201 that can be used in accordance with various aspects of the present disclosure.

FIG. 2 illustrates a stylus-based personal computer (PC) 201 that can be used in accordance with various aspects of the present invention. Any or all of the features, subsystems, and functions in the system of FIG. 1 can be included in or coupled to the computer of FIG. 2. The stylus-based personal computer system 201 includes a large touch-sensitive display surface 202, e.g., a digitizing flat panel display, such as a liquid crystal display (LCD) screen, on which a graphical user interface (in this example, including a plurality of windows 203) is displayed. Using a stylus, such as an electronic pen 204, a user can select, highlight, and write on the digitizing display area through direct contact with the digitizing display area and thereby enter electronic ink data into the system by interacting with the graphical user interface. In addition, the user may provide input to the digitizing display area by hovering the stylus near (for example, within a threshold distance in a direction normal to the digitizing display area, such as one centimeter) the digitizing display area without the stylus physically contacting the digitizing display area. The stylus-based computing system 201 interprets gestures made using pen 204 in order to manipulate data, enter text as electronic ink, and execute conventional computer application tasks, such as creating, editing, and modifying spreadsheets, word processing programs, and the like.

The pen 204 may be equipped with buttons or other features to augment its capabilities. In one example, the pen 204 may be implemented as a "pencil" or "pen," in which one end constitutes a writing portion and the other end constitutes an "eraser" end, and which, when moved across the display surface 202, indicates portions of electronic ink on the display that are to be erased. Other types of input devices, such as a mouse, trackball, keyboard, or the like also may be used. Additionally, a user's own finger could be used as a stylus input device, e.g., for selecting or indicating portions of the displayed image on the display surface 202. Consequently, the term "user input device," as used herein, is intended to have a broad definition and encompasses many variations on well-known input devices. Similarly, the term "stylus," as used herein, is intended to encompass many types of stylus input devices such as a human finger or an electronic pen.

In various examples, the system provides an ink platform as a set of COM (component object model) services that an operating system and/or an application program can use to capture, manipulate, and store ink and/or other stylus actions or events. The ink platform also may include a mark-up language including a language like the extensible markup language (XML). Additional examples of the ink platform may use the DCOM (distributed component object model) implementation. Yet further implementations may be used including the Win32 programming model and the .Net programming model from Microsoft Corporation. These platforms are commercially available and known in the art.

In addition to full performance stylus-based computing systems or "tablet PCs" (e.g., convertible laptops or "slate" type tablet PCs, both of which are known in the art), other types of stylus-based computing systems and/or other devices may be used that accept data as electronic ink and/or that accept, process, or display electronic stylus input, such as, but not limited to: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using a stylus or that can process electronic ink collected by another device (e.g., a conventional desktop computer that can process electronic ink collected by a tablet PC).

Figure 3:
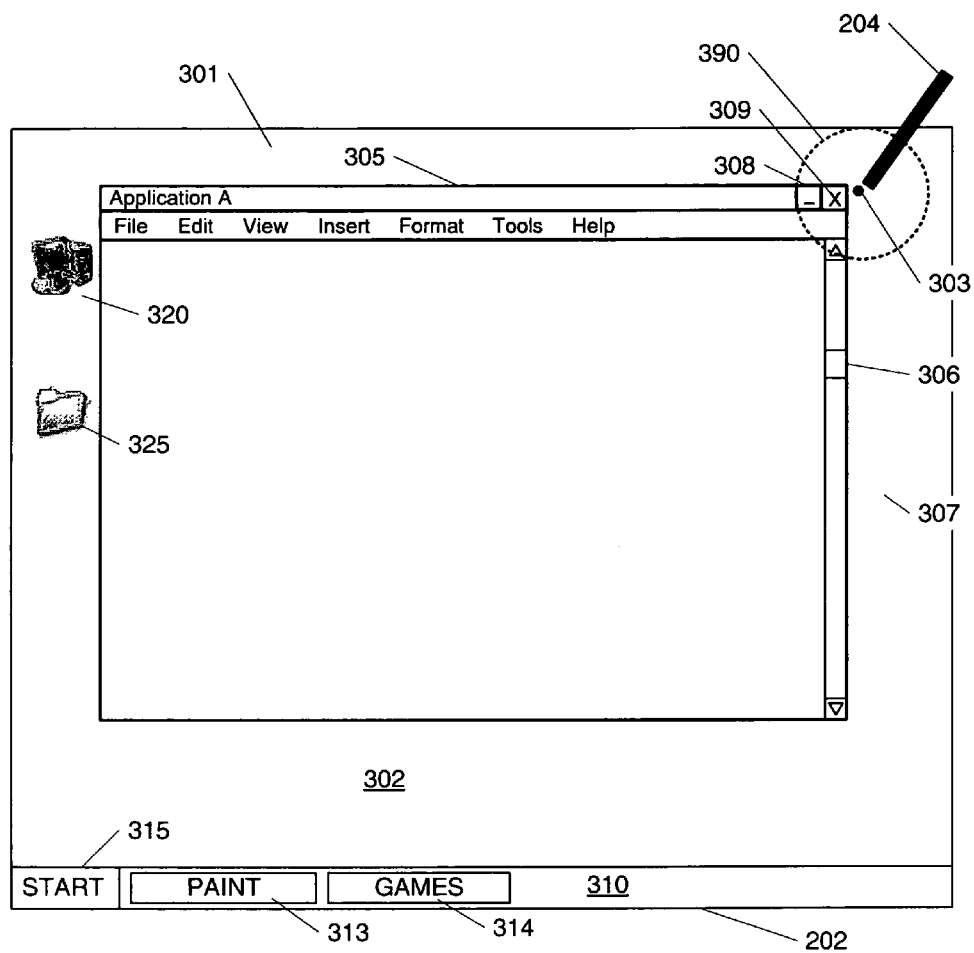
FIG. 3 illustrates a user interface and graphical elements thereof displayed on a computing device according to illustrative embodiments.

FIG. 3 illustrates a graphical user interface 301 displayed on display surface 202 of stylus-based PC 201 according to an illustrative embodiment. As with many computing devices and programs running thereon, an interface such as graphical user interface 301 is typically provided to facilitate user interaction with an associated operating system or application. To further enhance user interaction, graphical interface 301 includes one or more displayed graphical elements that, in some instances, may be used to execute various commands or applications upon user selection of or other input in relation to such graphical elements. In this example, user interface 301 includes graphical elements such as desktop 302, directory window 305, toolbar 310, program menu 315 and application or device icons 320 and 325. The graphical elements illustrated in FIG. 3 are typical of those implemented by the Microsoft WINDOWS line of operating systems. Desktop 302 is generally a background component that serves as an operating environment for stylus-based PC 201. Graphical elements 305, 310, 315, 320, and 325, as well as other graphical elements, may reside on desktop 302 or use desktop 302 as a backdrop when executed. For example, window 305 allows a user to browse folders and other data structures of an operating system to locate or organize files and data. When open, window 305 is superimposed on desktop 302 as is illustrated in FIG. 3.

In reference to the other graphical elements of user interface 301, a user may expand program menu 315 to view and/or select a list containing available programs or applications on stylus-based PC 201. A user may further create shortcuts such as icons 320 and 325 on desktop 302 of user interface 301 that are associated with an application, a device or a data structure (e.g., image file, document, audio file, etc.). Shortcut icons 320 and 325 may eliminate the need to navigate through multiple sub-directories to locate a program or file and thus, may provide faster access to often used programs, data or devices. When executed or opened, an application or data file is represented on toolbar 310 by a corresponding tool button. Toolbar 310 may be visible even when an application or data file is opened in a full-screen mode, allowing a user to identify other open applications or files without having to rearrange windows or other graphical components. In particular, a user may switch from an open application to an open data file or from one application to another application by selecting the tool button on toolbar 310 corresponding to the desired application. More specifically, in response to the user selecting a tool button corresponding to an open application, such as tool button 313 or tool button 314, the computer activates and/or opens the graphical component (e.g., application window) associated with the selected application. The appearance of tool buttons on toolbar 310 may change based on whether the corresponding application or file is active or open. For example, a tool button may appear depressed when its corresponding application or file is active or open and raised when its corresponding application or file is inactive or minimized.

As previously discussed, a user may use either his or her finger or another input device, such as stylus 204, in order to select or otherwise manipulate the graphical elements of interface 301. In one example, a user may touch stylus 204 to (or hover stylus 204 over) a tool box in the upper right hand corner of explorer window 305 to close the explorer window. In another example, a user may use his or her finger to drag scroll button 306 along scroll bar 307. One of skill in the art will appreciate that many other forms of interaction may be received via a touch-sensitive display screen. User interface 301 or the underlying application (e.g., operating system) may also implement predefined rules that specify the actions or events that are to occur upon detecting various types of user input. In one embodiment, a brief tap of the stylus to the screen may be mapped to a selection action, while a prolonged contact may correspond to magnification of an associated portion of the display screen. The differentiation of user input types and the aforementioned rules will be discussed in further detail. Moreover, although various examples will be discussed herein relating to user inputs that involve a touch of a stylus onto a touch-sensitive screen, it will be understood that this type of input is merely illustrative. All embodiments discussed herein may operate in like manner in response to other types of input, such as a stylus hover input.

Figure 4A:
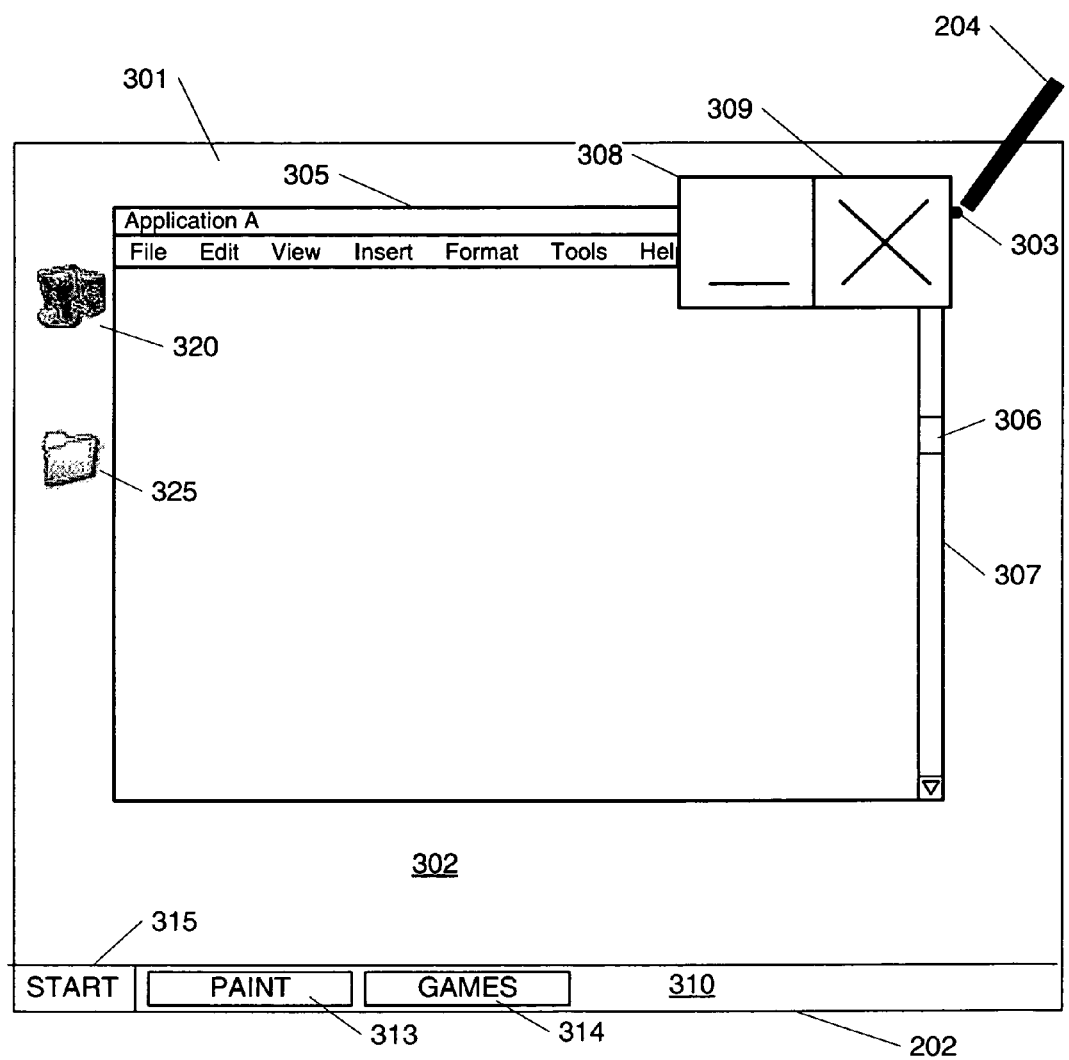
FIGS. 4A-4C illustrate three forms of user interface modifications according to illustrative embodiments.
Figure 4B:
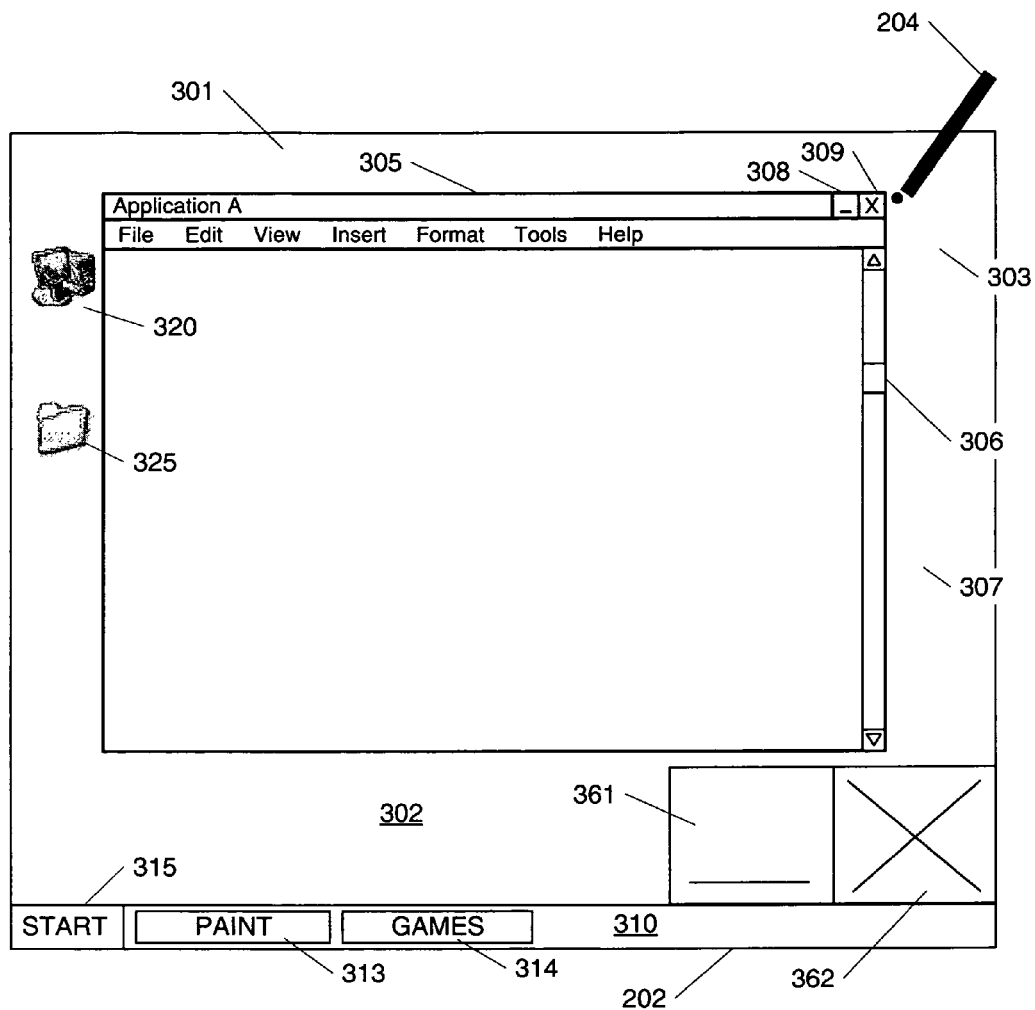
Figure 4C:
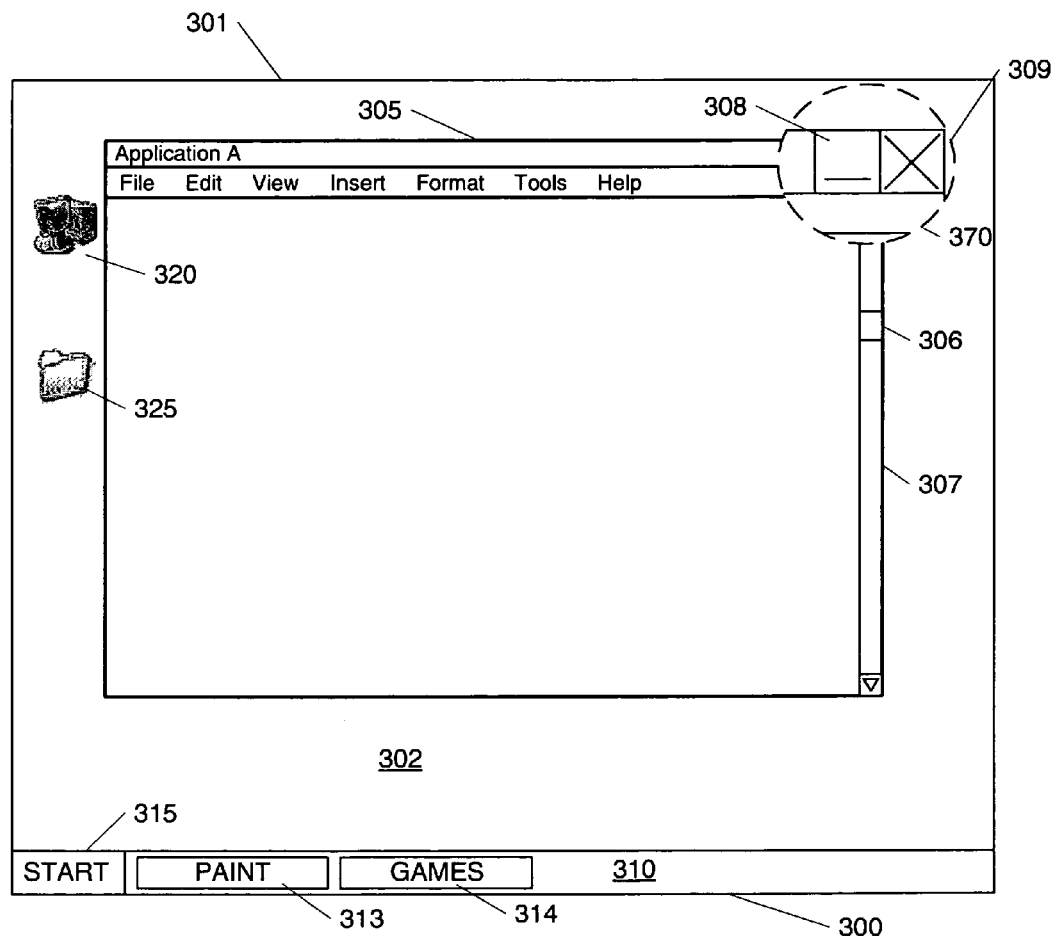

In FIGS. 4A-4C, three techniques for manipulating and modifying the user interface are shown according to illustrative embodiments. In each of FIGS. 4A-4C, graphical elements of the user interface are enlarged or otherwise modified in response to user input via a stylus (such as a user's finger) to facilitate the user input. Oftentimes, a user's finger may engage a broader area of the display screen than desired due to the size of the user's finger or the stylus' contact element. As a result, the user may unintentionally select or activate an application or otherwise select an incorrect graphical element. In another scenario, a user may have limited fine motor skills that hinder accurate selection of small graphical components. In the above situations, magnified or enlarged versions of elements or portions of interface 301 may improve reliability and accuracy of user interaction with user interface 301. It should be understood that other forms of modification or manipulation of user interface 301 may alternatively or additionally be implemented, such as shrinking and rotating graphical components of the user interface.

FIG. 4A illustrates the enlargement of interactive components of user interface 301 located within a specified area of the location of user input. More specifically, FIG. 4A relates to identifying one or more interactive or targetable graphical elements of user interface 301 within a predefined proximity of a user input location and increasing the size of the identified elements. For example, using stylus 204, a user may cause stylus 204 to contact a display surface 202 at a point of contact 303 as illustrated in FIG. 3. Because the point of contact 303 (i.e., the location of the user input) does not directly correspond to an interactive element of user interface 301, interface 301 may identify one or more interactive elements such as window resizing elements 308 and 309 that are within a predefined proximity zone to (e.g., within a predefined radius of) point of contact 303. For instance, a proximity zone 390 is illustrated in FIG. 3 as a circle centered about point of contact 303 or placed at a predefined distance and orientation (e.g., angle relative to a specified axis) from point of contact 303. Although proximity zone 390 is shown in FIG. 3 for explanatory purposes, it may or may not be visible to the user. Once identified, elements 308 and 309 are then enlarged by increasing the size of elements 308 and 309 by a specified amount. In doing so, the relative positions of elements 308 and 309 in interface 301 and window 305 may be maintained, as shown in FIG. 4A. According to one embodiment, the enlargement feature increases the visible size and interactive area of only the interactive elements that are within the proximity zone (in this example, elements 308 and 309). In other words, other parts of explorer window 305 that are not interactive (i.e., targetable) or that do not fall within proximity zone 390 are not enlarged, retaining their original dimensions or size. Consequently, the enlarged elements 308 and 309 may overlap previously visible areas of user interface 301 due to the elements' increased size.

FIG. 4B illustrates a variation of user interface 301 with enlarged cloned elements 361 and 362 according to an alternative illustrative embodiment. Rather than increasing the size and area of original elements 308 and 309, interactive elements 308 and 309 are cloned or copied. Additionally, other interface elements within a predefined proximity to interactive elements 308 and 309 may also be cloned to enhance user access to surrounding interface elements. Cloned elements 361 and 362 are displayed as enlarged versions of their original elements 308 and 309 to provide a user with larger contact areas with which to interact. Original elements 308 and 309 maintain their original sizes and characteristics in interface 301 of FIG. 4B. Cloned elements 361 and 362 may be located in a predefined location of user interface 301 or in a location that depends upon one or more factors such as the location of the user input. For example, a user may designate a fixed interaction area located in the lower right hand corner of an interface for displaying cloned elements. In one arrangement, the interaction area may be moved or modified by methods such as dragging the area or the cloned elements therein. In situations where a user arranges graphical components outside the designated interaction area, the cloning of interactive elements 308 and 309 may eliminate potential distortion and/or obscurity of existing graphical components in user interface 301. Additionally, user interface or screen elements outside of the interactive area may be faded to place emphasis and focus attention on cloned elements 361 and 362. In one or more alternative arrangements, cloned elements 361 and 362 may be visibly linked to corresponding elements 308 and 309 by one or more call-out elements (not shown), such as a line connecting between each original element and its corresponding cloned element. The call-out components would allow a user to visually determine element correspondence between cloned and original elements to ensure proper user interaction. The call-out components may be of any configuration or design including configurations and designs that eliminate the potential for screen clutter resulting from displaying a number of call-out components.

FIG. 4C illustrates user interface 301 with a magnified area 370 magnifying interactive elements 308 and 309 according to an illustrative embodiment. The user interface of FIG. 4C is similar to that of FIG. 4A in that original interactive elements 308 and 309 are enlarged and located in their original positions, rather than cloned and enlarged in a pre-designated interactive area of interface 301. However, one difference between the user interfaces of FIGS. 4C and 4A is that in FIG. 4C, a section of interface 301, in this case area 370, is magnified or enlarged rather than just the interactive elements (i.e., elements 308 and 309) located in area 370. Thus, as shown in FIG. 4C, not only are elements 308 and 309 magnified, but portions of explorer window 305 within area 370 are also magnified. Area 370 may be predefined according to user preferences and may manifest a variety of shapes such as rectangular, circular, hexagonal configurations or other shapes that may complement the user interface. For example, in the illustration of FIG. 4C, the magnification area 370 is circular. The dimensions of magnification area 370 may also be defined according to user preferences or automatically calculated by user interface 301. In one example, user interface 301 may identify minimum dimensions (e.g., radius) of area 370 to ensure that area 370 for a given point of contact 303 encompasses at least one interactive element. The location or position of magnified area 370 may be related to and/or defined by the location of point of contact 303. For example, circular magnification area 370 may be centered at point of contact 303 or placed at a predefined distance and orientation (e.g., angle relative to a specified axis) from point of contact 303. Magnification area 370 may further be characterized by either a soft outer edge or a hard outer edge. In FIG. 4C, area 370 is defined by a hard outer edge. All elements within the edge are magnified while elements outside of the edge remain unmagnified. In other words, a distinct threshold separates the magnified area and elements therein from the unmagnified area and elements therein. Alternatively, an area may have a soft outer edge, where the area is characterized by a gradual decrease in the degree of magnification as an element moves further away from a center point and toward the edge.

In the above descriptions of FIGS. 4A-4C, one of skill in the art will appreciate that numerous other interactive elements of a user interface may be modified and/or manipulated in a similar manner. Examples of such other elements may include menus, icons (e.g., thumbnails), and scrollbars. Additionally, the degree of magnification or enlargement may be specified by a user or, alternatively, defined by an automatic determination or calculation. One or more factors may be considered in determining the degree of magnification such as size of the display screen, screen resolution and number of interactive elements enlarged. Both the size of the display screen and screen resolution may limit the maximum enlargement size in order to avoid reducing the overall viewing experience of other aspects (i.e., useful adjacent elements) of the interface. In addition, limits to magnification may further be restricted based on the number of elements that must be enlarged at one time. For example, in FIGS. 4A-4C, both the closing element and the minimization element are both enlarged. If additional elements are identified and must also be enlarged at the same time, the overall degree of magnification of all elements (e.g., closing element and minimization element) may be reduced so that all of the magnified elements may be simultaneously displayed on the screen. Further, elements of the user interface that are not enlarged, magnified or cloned may be reduced in side, faded or otherwise have their appearance modified in order to emphasize the enlarged, magnified or cloned elements.

Figure 5:
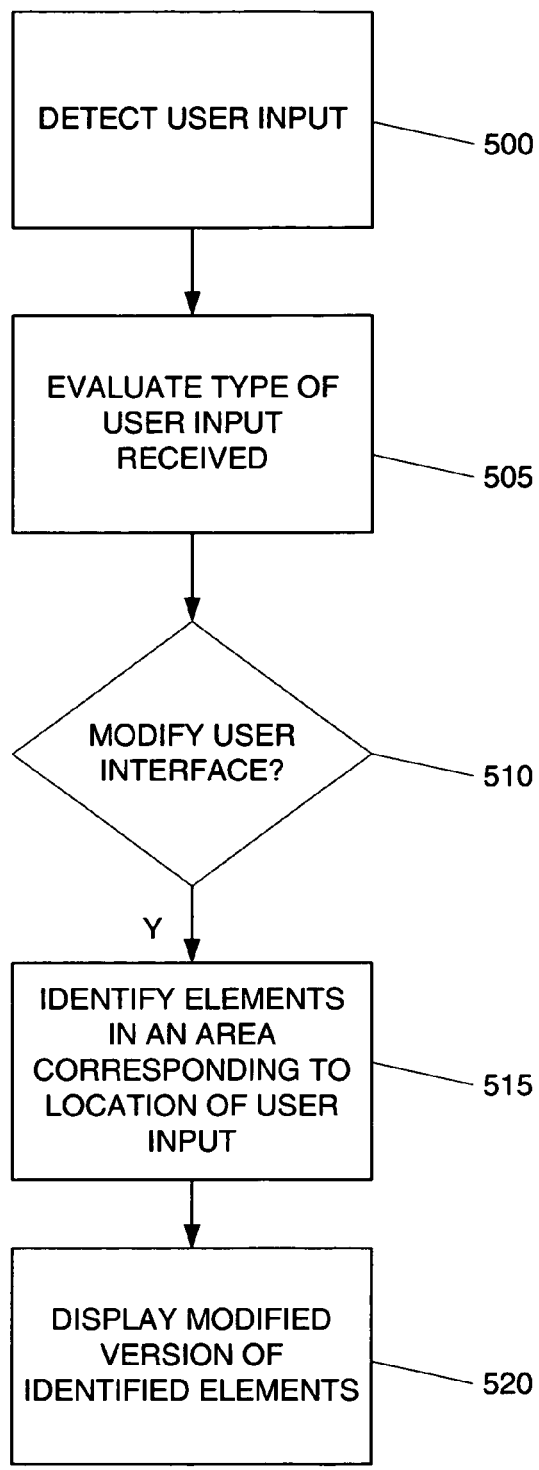
FIG. 5 is a flowchart showing a method for manipulating and modifying a user interface according to illustrative embodiments.

FIG. 5 is a flowchart showing a method for modifying one or more components of a user interface (such as user interface 301) according to an illustrative embodiment. In step 500, user input, such as a stylus touch or hover, is detected and received via an input device such as a touch-sensitive screen. Once user input has been detected, the type of user input received is evaluated in step 505. In step 510, the type of user input is compared to one or more predefined rules to determine if the input corresponds to a request to modify interactive elements of the user interface. As discussed previously, the determination step of 510 may be subject to predefined rules or user preferences that shape what actions should be taken and when depending on the type of user input. In some cases, types of user input may be differentiated based on a duration of contact with the touch sensitive display screen, a contact pressure and degree of movement. In other words, for instance, a brief tap of a stylus on the display screen may be treated differently than a prolonged contact of the stylus with the screen. Similarly, dragging a finger along the display screen may correspond to a different set of functions than holding a finger at a particular point of the screen for a predefined period of time. In yet another example, a user may initiate a magnification function by double-tapping the display screen. Alternatively or additionally, multi-finger gestures may also be used to activate various magnification or zooming functions. In one example, a user may drag two contact points, one contact point corresponding to each of two fingers, closer together to represent a magnify or zoom in command. Accordingly, a user may then drag the two contact points apart to initiate a zoom out or shrink function. One of skill in the art will appreciate that numerous forms and types of user input may be used to initiate the functions and methods described herein.

Regardless of the rules used in the determination in step 510, if a determination is made that the user input corresponds to a request to modify elements of the user interface, then one or more user interface elements are identified for magnification or modification in step 515. The interface elements may be identified based on a proximity to the user's point of contact with the display screen. Alternatively or additionally, the determination may be made with respect to a specified search area defined by the point of contact and various other parameters. Such parameters may be based, in part, on user preferences or settings. Additional details regarding the determination and identification of targetable or interactive elements corresponding to a magnification or enlargement request will be discussed with respect to FIG. 6.

Upon determining one or more interactive or targetable elements that correspond to the user's magnification request, enlarged or modified versions of the identified elements are displayed in step 520. The degree of enlargement may be defined by user preferences or based on a variety of factors associated with the user interface. As discussed previously, some of these factors may include screen resolution and display screen size. In addition, an optimal degree of magnification may be calculated or determined based on the number of components that require enlargement or magnification. Alternatively, a user may set a minimum size to which the components must be enlarged. For instance, users lacking fine motor skills may require a certain degree of magnification of interactive components that overrides any enlargement or magnification restrictions based on screen size or resolution limitations. Once an element is enlarged or magnified, then the user may interact with that enlarged or magnified element in the same manner as it was in its original unenlarged/ unmagnified state. Also, if the user removes the user input stimulus that caused the enlargement or magnification, then the elements may return to their original unenlarged/unmagnified state. Alternatively or additionally, an application or user interface may store a pre-generated enlarged version of the interactive elements or of the entire application user interface. Thus, instead of enlarging the original interactive element, the user interface may retrieve and display the pre-generated enlarged or modified version.

Figure 6:
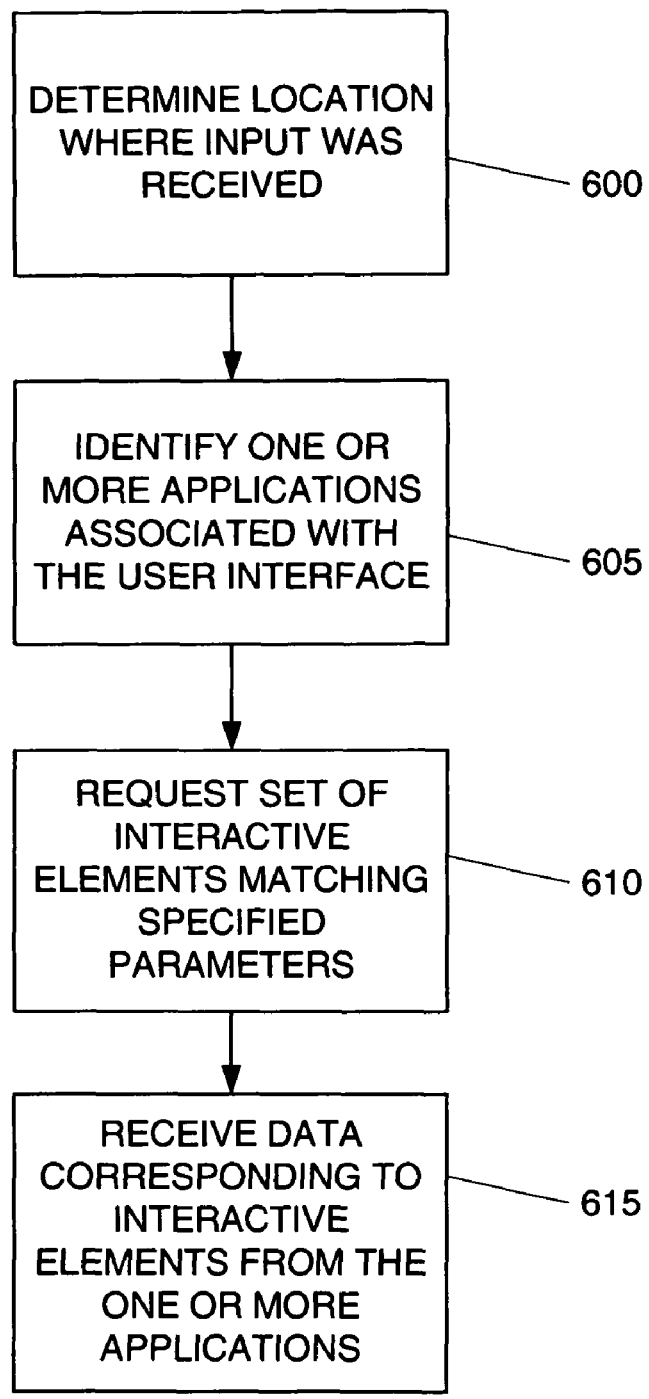
FIG. 6 is a flowchart showing a method for determining targetable items within a specified search area according to illustrative embodiments.

FIG. 6 is a flowchart showing a method for identifying elements within a specified proximity or area of the location of user input on a user interface (such as user interface 301). Initially, in step 600, a location of the user input (e.g., where the stylus contacted the display screen) is determined. The location may be represented by absolute coordinates associated with predefined axes or by relative positional data corresponding to one or more components of the interface with known locations. In step 605, applications running on or associated with the user interface are then identified. The underlying operating system may maintain a database of the applications currently active or running in the user interface. A message is then sent to the identified applications requesting a set (i.e., at least one) of targetable or interactive elements of the applications that are within a specified search area of the input location in step 610. The message may include coordinates or position data corresponding to the input location as well as parameters (e.g., dimensions, location) associated with the specified search area. In addition, the request message may provide search parameters such as a type of interactive element or an element with a specified status.

An application then evaluates the message data to determine targetable elements falling within the provided parameters, eliminating any targetable elements that are, for example, too distant from the input location to be relevant. Each identified application then returns a set of matching targetable elements along with associated data. The associated data may include coordinate information, dimension information, type of interaction and status. Types of interaction may include simple selection, scrolling, menu navigation and the like. The status of a targetable element may, in some cases, make it unavailable for interaction. Using the returned information, each matching targetable element is then enlarged or magnified according to step 520 in FIG. 5. In some situations, the identified applications may return a number of targetable elements that exceeds a predefined limit. Again, such a limit may be determined by screen size restrictions or limitations of the screen resolution. Consequently, one method of reducing the number of returned elements is to resend the request message with a narrowed search area. This process may be repeated until an optimal number of targetable elements are returned. In at least one arrangement, one or more of the targetable elements may be removed from the set based on one or more rules. Similarly, if no targetable elements are identified or an insufficient number is returned, a request message may be resent with a broader search area.

Alternatively or additionally, an application running on the user interface may automatically broadcast or advertise the location of its interactive elements or controls. In such a case, applications might not be queried. Instead, the operating system or underlying user interface may independently evaluate the advertised locations in order to determine which elements are within a predefined proximity to the input location. The user interface interaction methods and systems described herein may further include adaptive processes for identifying relevant user interface elements from applications implementing different protocols.

In the above and in alternative embodiments, a touch-sensitive display screen may include pressure detection components that evaluate a level of pressure a user applies while contacting the display screen. Using pressure detection, the manipulation (i.e., magnification) of the user interface may be further customized according to the user's contact pressure. For example, the degree of magnification or enlargement may correspond directly, and in real time, to the amount of pressure applied. Thus, a user may increase the degree of pressure in order to increase magnification or enlargement of the interactive elements. Alternatively, the amount of pressure may be related to the size of the area from which targetable elements and/or applications are identified.

While aspects have been described with respect to the enlargement or magnification or user interface elements, other modifications or manipulations of the user interface environment or elements thereof may be similarly implemented. For example, instead of enlargement or magnification, a user may define certain types of user input to result in a reduction in size of various graphical elements (e.g., a window). In another example, instead of or in addition to enlargement or magnification, some types of user input may result in rotation of the graphical elements in the interface. Additionally, while features have been described with respect to tablet PC and touch-sensitive display screens thereof, the methods and systems described herein may also be implemented in various other computing systems. As mentioned above, PDAs and cellular phones are other devices that could benefit from implementing such an interface manipulation method and system. Other input devices such as mice, position sensors and touchpads may also provide user input to the methods and systems described.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer readable storage medium storing computer readable instructions that, when executed by a processor, cause a processor to perform a method for modifying a user interface displayed on a touch-sensitive display screen, the method comprising the steps of:
   receiving user input via the touch-sensitive display screen;
   identifying at least one application associated with the user interface;
   identifying all interactive elements of the at least one identified application located in an area of the user interface, wherein the area is based on a location of the touch sensitive display screen where the user input was received, and the area is selectable from any portion of the user interface; and
   displaying, without moving unidentified interactive elements, the identified interactive elements with varying levels of magnification depending on their location in the area, wherein:
   at least one level of magnification is adjusted depending on the number of identified interactive elements; and
   displaying the identified interactive elements with varying levels of magnification depending on their location in the area comprises narrowing the area to reduce the number of identified interactive elements and displaying the identified interactive elements in the narrowed area with greater magnification than the identified interactive elements outside the narrowed area.

2. The computer readable storage medium of claim 1, wherein the step of receiving user input via a touch-sensitive display screen further comprises detecting a pressure associated with the received user input.

3. The computer readable storage medium of claim 2, wherein the level or varying levels of magnification of the enlarged version also depend on the detected pressure associated with the received user input.

4. The computer readable storage medium of claim 2, wherein a size of the area is based on the detected pressure.

5. The computer readable storage medium of claim 1, wherein displaying the identified interactive elements with varying levels of magnification depending on their location in the area comprises changing magnification of identified interactive elements depending on a distance from a center of the area.

6. The computer readable storage medium of claim 1, wherein the step of identifying all interactive elements of the at least one identified application located in an area of the user interface comprises requesting a set of interactive elements associated with the area.

7. The computer readable storage medium of claim 6, wherein the step of requesting a set of interactive elements associated with the area comprises transmitting a request message comprising data associated with the area and the location at which the user input was received.

8. The computer readable storage medium of claim 1, further comprising magnifying the entire area of the user interface with varying levels of magnification depending on a location in the area or with the same level of magnification adjusted depending on the number of interactive and non-interactive elements in the area.

9. A computer readable storage medium storing computer readable instructions that, when executed by a processor, cause a processor to perform a method for modifying a user interface, the user interface comprises at least one displayed interactive element and at least one displayed non-interactive element each having a first size, the method comprising the steps of:
   receiving user input;
   identifying all interactive elements located in an area of the user interface, wherein the area is based on a location where the user input was received, and the area is selectable from any portion of the user interface; and
   in response to a result of the step of identifying all interactive elements in the area, displaying, without moving unidentified interactive elements, the identified interactive elements with varying levels of magnification depending on their location in the area, wherein:
   at least one level of magnification is adjusted depending on the number of identified interactive elements; and
   displaying the identified interactive elements with varying levels of magnification depending on their location in the area comprises narrowing the area to reduce the number of identified interactive elements and displaying the identified interactive elements in the narrowed area with greater magnification than the identified interactive elements outside the narrowed area.

10. The computer readable storage medium of claim 9, wherein the step of identifying all interactive elements located in an area of the user interface, further comprises:
   identifying at least one application associated with the user interface; and
   requesting a set of interactive elements associated with the area.

11. The computer readable storage medium of claim 10, wherein the step of identifying at least one application associated with the user interface comprises identifying at least one application with an associated graphical element on the user interface.

12. The computer readable storage medium of claim 10, wherein the step of requesting a set of interactive elements associated with the area comprises transmitting a request message to the at least one application.

13. The computer readable storage medium of claim 9, further comprising the steps of:
- determining a type of user input other than the location of the input;
- comparing said type of user input to at least one predefined rule to determine whether they correspond, wherein the at least one predefined rule defines a type of modification of the interactive elements associated with the type of user input; and
- if the user input corresponds to the predefined rule, displaying the identified interactive elements in accordance with the type of modification of the interactive elements.

14. The computer readable storage medium of claim 9, wherein displaying the identified interactive elements with varying levels of magnification depending on their location in the area comprises changing magnification of identified interactive elements depending on a distance from a center of the area.

15. The computer readable storage medium of claim 9, further comprising the step of receiving user input corresponding to user interaction with at least one of the identified elements displayed in a second size.

16. A method for modifying a user interface, the user interface comprising at least one displayed interactive element and at least one displayed non-interactive element each having a first size, the method comprising the steps of:
- receiving user input;
- identifying all interactive elements located in an area of the user interface, wherein the area is based on a location where the user input was received, and the area is selectable from any portion of the user interface; and
- in response to a result of the step of identifying all interactive elements in the area, displaying, without moving unidentified interactive elements, the identified interactive elements with varying levels of magnification depending on their location in the area, wherein:
  - at least one level of magnification is adjusted depending on the number of identified interactive elements; and
  - displaying the identified interactive elements with varying levels of magnification depending on their location in the area comprises narrowing the area to reduce the number of identified interactive elements and displaying the identified interactive elements in the narrowed area with greater magnification than the identified interactive elements outside the narrowed area.

17. The method of claim 16, wherein the step of identifying all interactive elements associated with an area of the user interface, further comprises:
- identifying at least one application associated with the user interface; and
- requesting a set of interactive elements associated with the area.

18. The method of claim 16, further comprising:
- determining a type of user input other than the location of the input;
- comparing said type of user input to at least one predefined rule to determine whether they correspond, wherein the at least one predefined rule defines a type of modification of the interactive elements associated with the type of user input; and
- if the user input corresponds to the predefined rule, displaying the identified interactive elements in accordance with the type of modification of the interactive elements.

* * * * *